United States Patent
Srinivas et al.

(10) Patent No.: US 9,334,361 B2
(45) Date of Patent: May 10, 2016

(54) PROCESS FOR PREPARING HYPERBRANCHED POLYESTERS

(75) Inventors: Darbha Srinivas, Pune (IN); Joby Sebastian, Pune (IN)

(73) Assignee: Council of Scientific & Industrial Research, New Delhi (IN)

( * ) Notice: Subject to any disclaimer, the term of this patent is extended or adjusted under 35 U.S.C. 154(b) by 221 days.

(21) Appl. No.: 14/001,322

(22) PCT Filed: Feb. 23, 2012

(86) PCT No.: PCT/IN2012/000125
§ 371 (c)(1),
(2), (4) Date: Aug. 23, 2013

(87) PCT Pub. No.: WO2012/114357
PCT Pub. Date: Aug. 30, 2012

(65) Prior Publication Data
US 2013/0331542 A1   Dec. 12, 2013

(30) Foreign Application Priority Data

Feb. 23, 2011   (IN) .............. 471/DEL/2011

(51) Int. Cl.
| | | |
|---|---|---|
| C08G 63/00 | (2006.01) | |
| C08G 63/83 | (2006.01) | |
| C08G 63/12 | (2006.01) | |
| C08G 63/87 | (2006.01) | |
| B01J 27/26 | (2006.01) | |
| B01J 35/10 | (2006.01) | |

(52) U.S. Cl.
CPC .............. *C08G 63/83* (2013.01); *C08G 63/12* (2013.01); *C08G 63/87* (2013.01); *B01J 27/26* (2013.01); *B01J 35/1061* (2013.01); *Y02P 20/52* (2015.11)

(58) Field of Classification Search
CPC ...... C08G 63/83; C08G 63/823; C08G 63/87; C08G 2101/0058; C08G 2101/0083; C08G 63/668; C08G 65/2603; C08G 65/2642; C08G 65/2696; C08G 65/34; B01J 27/26; B01J 31/02; B01J 35/1061
See application file for complete search history.

(56) References Cited

U.S. PATENT DOCUMENTS

| | | |
|---|---|---|
| 7,754,643 B2 | 7/2010 | Srinivas et al. |
| 2007/0093380 A1* | 4/2007 | Srinivas et al. ............... 502/175 |
| 2008/0108719 A1 | 5/2008 | Geiger et al. |
| 2010/0048813 A1 | 2/2010 | Clauss et al. |

FOREIGN PATENT DOCUMENTS

| | | | |
|---|---|---|---|
| DE | 10 2008 004343 | * | 7/2008 |
| DE | 102008004343 A1 | | 7/2008 |

OTHER PUBLICATIONS

Stumbe et al "Hyperbranched Polyesters Based on Adipic Acid and Glycerol" Macromol, 2004, pp. 921-924.*

* cited by examiner

*Primary Examiner* — Ling Choi
*Assistant Examiner* — Gennadiy Mesh
(74) *Attorney, Agent, or Firm* — Blank Rome LLP

(57) ABSTRACT

Process for preparing hyperbranched polyesters at atmospheric pressure by reacting polyols with polycarboxylic acid in the presence of a heterogeneous, reusable, acid, crystalline, micro-mesoporous double-metal cyanide catalyst $Zn_3M_2(CN)_n(ROH).xZnCl_2.yH_2O$ at moderate temperatures for a short period of reaction time. Examples of a polyol include glycerol, sorbitol, mannitol, glucose and sucrose. Examples of a polycarboxylic acid include succinic acid and adipic acid. The hyper-branched polyester produced has a high degree of branching (56-90%), a low viscosity (inherent viscosity 0.02-0.1 dL/g), and a controlled gelation.

11 Claims, 4 Drawing Sheets

PROCESS FOR PREPARING HYPERBRANCHED POLYESTERS

CROSS-REFERENCE TO RELATED APPLICATIONS

The present application is a national phase of International Patent Application No. PCT/IN2012/000125, filed Feb. 23, 2012, which claims priority to Indian Patent Application No. 471/DEL/2011, filed Feb. 23, 2011, the entire disclosures of which are incorporated by reference herein.

FIELD OF INVENTION

The present invention relates to a process for preparing hyperbranched polyesters in the presence of a solid-acid catalyst.

More particularly, the present invention relates to an efficient, eco-friendly, solvent-free process for preparing hyperbranched polyesters comprising contacting polyols with polycarboxylic acids in the presence of a solid, acidic, crystalline, micro-mesoporous double-metal cyanide catalyst.

BACKGROUND OF THE INVENTION

Hyperbranched polyesters belong to the family of dendrimers bearing large number of functional groups on their periphery. Despite their high polydispersities and low degree of branching, their chemical performances are quite similar to their dendrimer analogues.

Topological specifics of hyperbranched polymers like high level of solubility and compatibility, low viscosity of solutions, resistance to aggregate even in concentrated solutions, ability to function as nanocontainers for substances sorbed inside, weak dependence of hydrodynamic volume on molecular weight and lump of free ends of chains with functional groups on their periphery open a new window for their diverse industrial use.

Hyperbranched polymers find wide applicability as cosmetics, food additives, surfactants, lubricants, plasticizers, drug delivery agents, azeotropic phase separators, in orthopaedic and ophthalmic fields, building blocks for preparing poly-addition or poly-condensation polymers, additives in paints, coverings, adhesive promoters, sealants, casting elastomers, as rheology modifiers and as surface or interface modifiers. Discovery of unique properties of hyperbranched polyesters has expedited a rapid development in this area of materials. Hyperbranched polyesters derived from renewables broaden their applicability as novel, environmental-friendly materials for various applications.

Polyesters are conventionally synthesized by polycondensation of di- or polycarboxylic acids with polyols. Industrially, aromatic polyesters, i.e., polyesters from aromatic dicarboxylic acids such as phthalic acid or terephthalic acid and alcohols such as 1,2-ethane diol, 1,2- or 1,3-propane diol or 1,4-butane diol, are more significant. The special applications of aliphatic, biodegradable polyesters derived from parent molecules like succinic acid, glutaric acid or adipic acid and alcohols such as 1,2-ethane diol, 1,2- or 1,3-propane diol, 1,3- or 1,4-butane diol, 1,5-pentane diol or 1,6-hexane diol are making these polymers more attractive in recent years.

U.S. Pat. No. 6,441,126 and US 20100048813 describes a process for producing cross-linked, branched, aliphatic polyesters for gum base from glycerol and adipic acid at 150-200° C. without any catalyst under solvent-free conditions.

EP 0799279 discloses the synthesis from an ethoxylated pentaerythritol and 2,2-dimethylol propanoic acid using conventional homogenous mineral acid catalyst, $H_2SO_4$, at 140° C. Similarly several prior arts are available that disclose synthesis of polyesters from different reactants employing different catalysts, in solvent-free conditions or in the presence of solvent. Enzymatic and microbial catalysed processes also form part of prior art in this area. The results of such prior art processes are polyesters that do not possess the characteristics of low viscosity at a high degree of branching and with controlled gelation.

There are certain drawbacks with the prior art processes which include that the polyesters produced have high viscosity and lower degree of branching. The final product is always a gel. Controlled gelation at high conversions is an issue. Tuning the topological characteristics of hyperbranched polyesters is desirable to focus their application in specialized fields. Recovery of homogeneous catalysts and their reusability is also an issue with the mineral acid and organometal catalysts. Further, the organometal catalysts e.g., dibutyltin, butylstanoic acid etc are air and moisture sensitive. As water is formed as a by-product in the polyesterification reaction, the organometal catalysts soon get deactivated. Corrosion of reactors and pipe lining is a problem with mineral acid catalysts. Although the reaction occurs at mild temperature while using enzyme catalysts, long reaction times of nearly 24 h are needed. A solid catalyst-based process has several engineering, environmental and economic advantages. The solid catalyst can be easily separated and reused in subsequent recycles. It is therefore desirable to develop an efficient solid catalyst-based process for producing hyperbranched polyesters of low-viscosity and high degree of branching with controlled gelation to achieve polyesters for speciality applications.

Double-metal cyanides were used as catalysts for the preparation of polyether polyols (WO 2009055436; U.S. Pat. No. 6,624,286; Chen et al., J Polym Sci A Polym Chem., Year 2004, Vol. 42, pp. 6519), alternative copolymerization of epoxides and $CO_2$ (U.S. Pat. Nos. 6,359,101, 6,953,765 and 6,852,663) and biodiesel and biolubricants manufacture by transesterification/esterification of vegetable oils or animal fat (monohydric carboxylic acid) with monohydric alcohols (U.S. Pat. Nos. 7,754,643, 7,482,480 and 7,842,653; EP 1 733 788; Sreeprasanth et al., Appl. Catal. A: Gen., Year 2006, Vol. 314, pp. 148). However, their application for the preparation of hyperbranched polyesters is not disclosed so far.

It is surprising that double metal cyanide catalysts with cubic crystallite structure, micro-mesoporous architexture, strong Lewis acid centers and surface hydrophobicity exhibit high catalytic activity to produce hyperbranched polyesters especially those with low-viscosity, high degree of branching and controlled gelation.

Double metal cyanide catalysts of different crystallite structures (monoclinic) and amorphous nature have been used for the preparation of polyesters and other hybrid polymers as described in the following prior arts.

DE 10 2008 004 343 A1 discloses a process for preparing polyester alcohol useful to prepare polyurethane foams and thermoplastic polyurethane elastomers, comprising catalytic conversion of at least a difunctional carboxylic acid with at least a difunctional alcohol, where at least a part of the reaction is carried out in the presence of a polymetal cyanide or a double metal cyanide catalyst usually in an amount up to 1% by weight of the reaction mixture. The polycondensation reaction can be performed both in presence and in absence of a solvent at temperature 160-280° C. This disclosure is specific for conversion of dicarboxylic compounds with dihydroxy compounds. The product is a linear polyester whereas the instant invention describes a hyperbranched polyester with low-viscosity and high degree of branching at controlled gelation.

WO 2011/137011 A1 tells a process for preparing a hybrid polyester-polyether polyols comprising reacting a carboxyl group-containing component and an epoxide, optionally in the presence of one or more double metal cyanide catalyst, a superacid catalyst, a metal salt of a superacid catalyst and/or a tertiary amine catalyst, under conditions such that a hybrid polyester-polyether polyol is formed. Further, the said reaction is carried out in presence of solvent such as toluene. The process results in products having narrow polydispersity, a low acid number and unsaturation and reduced byproducts formation, particularly when the metal cyande catalyst is employed. The product is a hybrid polyester-polyether-polyol, different from that of the present invention. US 7842653 describes a process for preparing lubricants wherein the said process comprises contacting a monocarboyxlic vegetable oil or fat with a monohydric C6-C8 alcohol in the presence of a double-metal cyanide catalyst wherein the vegetable oil/fat to alcohol molar ratio being 1:6, reaction temperature being in the range 150-200° C. and reaction time being in the range 3-6 hrs. The product is a monoester.

WO 2011/075343 A1 discloses a process to convert a secondary hydroxyl-capped polyol to a primary hydroxyl-capped polyol comprises reacting a polyether polyol, a polyester polyol, polyether-ester polyol or a polyether-polyester polyol with a cyclic anhydride of a polycarboxylic acid to form a half acid ester, followed by the reacting the half acid ester with ethylene oxide, to form a polyester polyol or a polyether-polyester polyol. Both steps are carried out in the presence of an amine catalyst and a double metal cyande catalyst. The latter catalyst useful for polymerization of epoxides generally may include an organic complex agent such a diglyme.

CN101570595 discloses a terpolymer containing polyester chain links and polycarbonate chain links and a synthetic method thereof, which comprises the mixing of zinc-cobalt double metal cyanide complex catalyst, cyclohexene oxide and dicarboxylic anhydride in a solvent.

The double metal cyanide catalyst used in the present invention is unique and thereby shows efficient catalytic activity for the preparation of hyperbranched polyesters. The unusual surface hydrophobicity of the catalyst facilitates the adsorption of polycarboxylic acids and polyols but not the water formed as by-product in the esterification reaction and micro-mesoporous architecture controls the gelation and degree of branching.

OBJECTIVES OF THE INVENTION

The main object of present invention is to provide a process for preparing hyperbranched polyesters of low viscosity, high degree of branching and controlled gelation making use of an efficient, reusable, heterogeneous acid catalyst.

Another object of present invention is to provide an efficient, eco-friendly process for the synthesis of hyperbranched polyesters from renewables in presence of a solid, reusable, acid catalyst.

Yet another objective is to describe a process for providing hyperbranched polyesters at moderate temperatures, short period of reaction time and solvent-free conditions.

SUMMARY OF THE INVENTION

Accordingly, the present invention provides an efficient, eco-friendly, solvent-free a process for preparing hyper branched polyesters having degree of branching in range 45-90% and inherent viscosity in the range 0.02-0.1 dL/g and the said process comprising the steps of:
  (a) contacting a polyol with a polycarboxylic acid in the presence of a double-metal cyanide catalyst wherein the polyol to polycarboxylic acid molar ratio is in the range 1:1 to 1:2 and catalyst in the range 2-5 wt % of reactants;
  (b) subjecting the reaction mixture as obtained in step (a) at temperature in the range of 160 to 200° C. and for a reaction period of 0.5-2 h to obtain polyesters;
  (c) dissolving the reaction mixture obtained in step (b) in a polar solvent like acetone and separating the catalyst by filtration;
  (d) adding a non-polar solvent like heptane to the reaction mixture obtained from step (c) to precipitate out and isolate the hyper branched polyesters.

In one embodiment of the present invention the chemical formula of double metal cyanide Catalyst used in step (a) is:

$$Zn_3M_2(CN)_n(ROH).xZnCl_2.yH_2O$$

wherein R is tertiary-butyl; M is a transition metal ion selected from the group consisting of Fe and Co; x varies from 0 to 0.5, y varies from 3-5 and n is 10 or 12.

In another embodiment of the present invention the polyol used in step (a) has atlest two alcoholic groups.

In another embodiment of the present invention the polyols is selected from the group consisting of glycerol, sorbitol, mannitol, glucose and sucrose.

In another embodiment of the present invention the polycarboxylic acid used in step (a) contains at least two carboxylic groups.

In another embodiment of the present invention the polycarboxylic acid used in step (a) is selected from the group consisting of succinic acid and adipic acid.

In another embodiment of the present invention the solid catalyst is reusable.

In another embodiment of the present invention the isolated yield of polyester is in the range 50-90 wt %.

In an embodiment of the present invention, the double-metal cyanide catalyst was prepared as per the U.S. Pat. No. 7,754,643 and has the characteristics as described therein.

In an embodiment of the present invention, the catalyst is crystalline and has cubic structure showing sharp and intense powder X-ray diffraction peaks at 2θ=11.34, 13.94, 14.22° with corresponding d-spacings of 7.79, 6.22, 6.34 angstroms, respectively as shown in FIG. 1.

In yet another embodiment, the catalyst of the present invention possesses micro-mesoporous architecture as shown in FIG. 2 (high-resolution transmission electron micrograph) and an average pore diameter of 2.5 nanometers as revealed the the $N_2$ adsorption-desorption isotherm data (FIG. 3).

In still another embodiment of the present invention the catalyst is hydrophobic at reaction conditions and contains Lewis acid centers (FIG. 4; Pyridine-IR spectrum) due to tetra-coordinated $Zn^{2+}$ ions in the crystalline framework with the total acidity of the catalyst being in the range 1.5-2.2 mmol/g.

In yet another embodiment of the present invention, the degree of branching of the polyester is in the range 45-90%.

In still another embodiment of the present invention, the viscosity of the polyester is in the range 0.02-0.1 dL/g.

DETAILED DESCRIPTION OF THE INVENTION

In the investigations leading to the present invention, it was found that the M-Zn double-metal cyanide catalysts with micro-mesoporous architecture are highly efficient and could be easily separated from the products for further reuse. The prior art catalysts, mineral acid, organometallic compounds and enzymes needed additional process steps and efforts for catalyst separation. Moreover those catalysts cannot be recycled. Although double-metal cyanide catalysts have been used in several acid catalyzed reactions, their application for the polycondensation of polycarboxylic acids with polyols resulting hyperbranched polyesters with low viscosity and high degree of branching and controlled gelation is disclosed in this invention. An easily separable catalyst system e.g., the catalyst of the present invention is more advantageous. The solid catalyst of the present invention is not only efficient but avoids the tedious process of catalyst recovery characteristic of the prior art processes.

The catalyst of the present invention yields hyperbranched polyesters of low viscosity, high degree of branching and controlled gelation from renewable feedstock at moderate temperatures, short period of reaction time and solvent-free conditions.

It is a feature of the process of present invention that the catalyst is a solid and the reaction takes place in a heterogeneous condition. The solid catalyst can be easily separated from products by centrifugation-filtration/decantation for further reuse.

It is another feature of the process of present invention that the process is eco-friendly, economical and generates no waste products unlike in the prior art processes in the process steps of catalyst separation/removal.

It is the unique feature of the catalyst of present invention that its unusual surface hydrophobicity (that facilitates the adsorption of polycarboxylic acids and polyols but not the water formed as by-product in the polyesterification reaction) and micro-/mesoporous architecture (that controls the gelation and degree of branching).

Yet another feature of the present invention is that the polyesterification reaction is conducted in the absence of a solvent.

Yet another feature of the present invention is that the polyester is prepared from bio-derived polyol feedstocks and it is biodegradable.

It is a feature of the process of present invention that the polyester has low viscosity unlike that in the prior art processes which produce gel.

Still another feature is that the reaction completes in a short period of times ca., 0.5-2 h.

Still another feature of the present invention is that the number average molecular weight of the polymer can be tuned to be in the range 1000-6000 depending on reaction temperature and reaction time.

The present invention is illustrated herein below with examples, which are illustrative only and should not be construed to limit the scope of the present invention in any manner.

EXAMPLE 1

Figure 1:
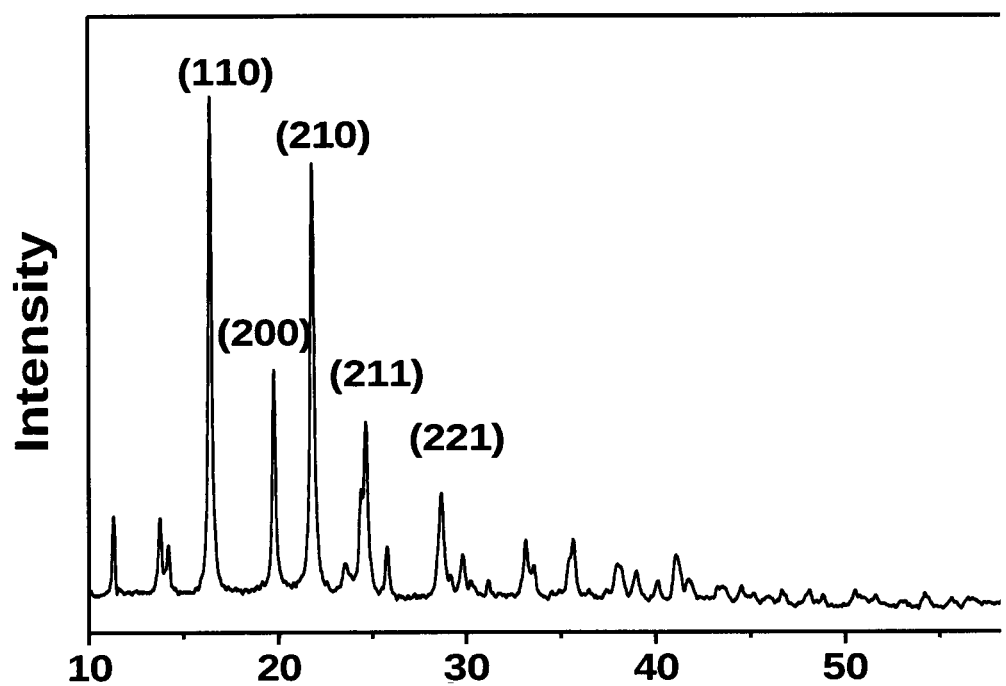
FIG. 1: X-ray diffraction pattern of Fe—Zn double-metal cyanide catalyst. Catalyst is crystalline and has cubic structure showing sharp and intense powder X-ray diffraction peaks at 2θ=11.34, 13.94, 14.22° with corresponding d-spacings of 7.79, 6.22, 6.34 angstroms, respectively.
Figure 2:
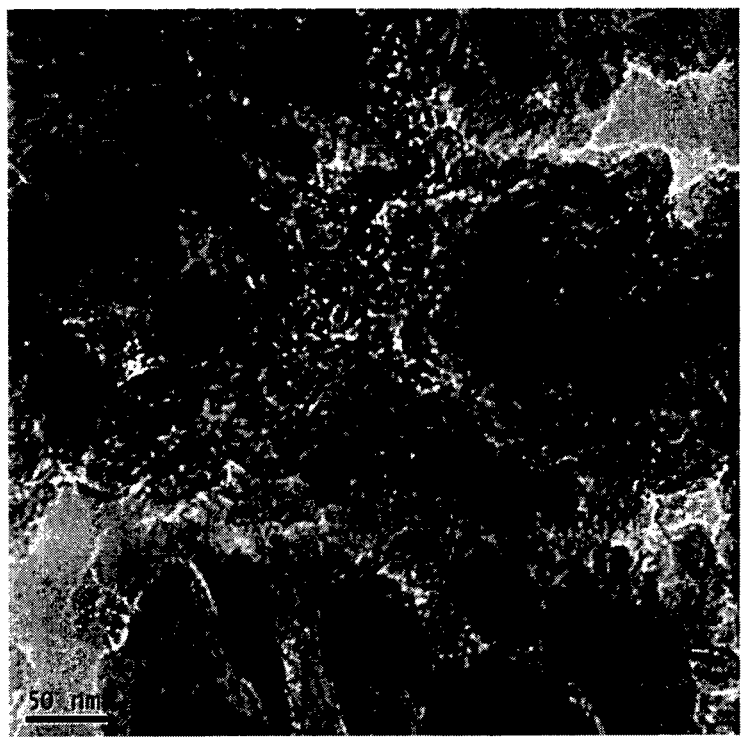
FIG. 2: High-resolution transmission electron micrographs of micro-mesoporous Fe—Zn double-metal cyanide catalyst.
Figure 3:
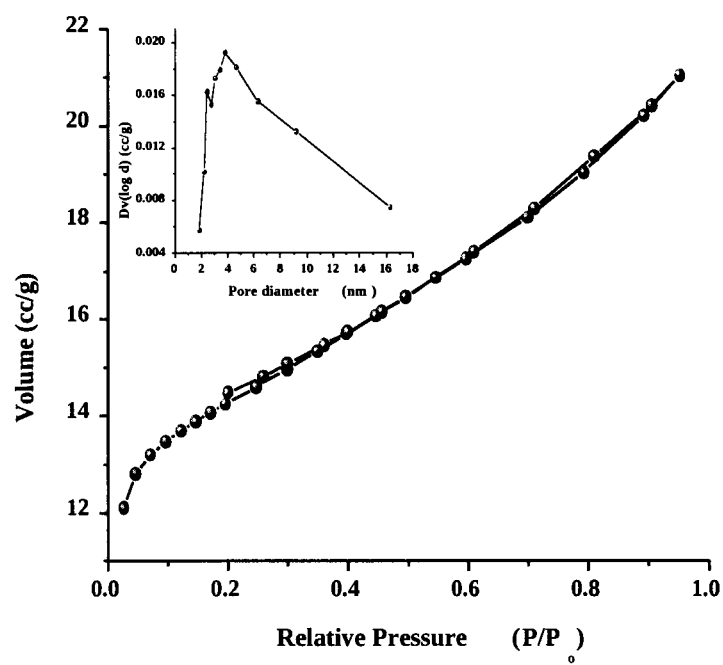
FIG. 3: Nitrogen adsorption-desorption isotherms of Fe—Zn double metal cyanide catalyst. Inset shows pore size distribution.
Figure 4:
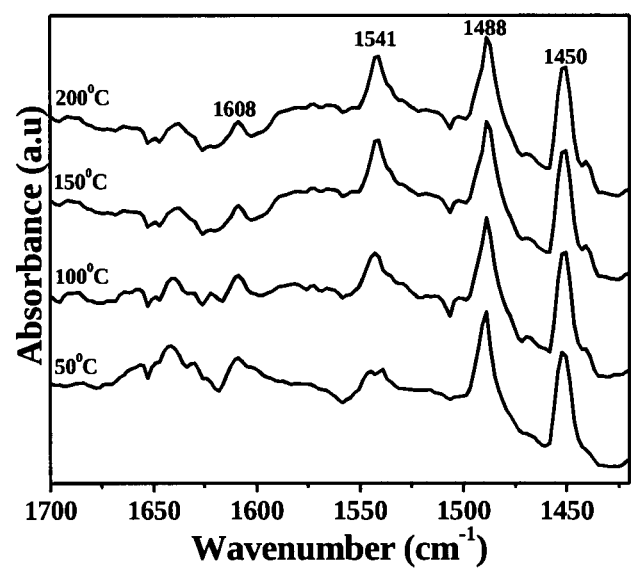
FIG. 4: Pyridine-IR spectra of Fe—Zn double metal cyanide catalyst.

This example illustrates the preparation of Fe—Zn double metal cyanide catalyst used in the present invention. $K_4[Fe(CN)_6]$ (0.01 mol) was dissolved in double distilled water (40 ml) (Solution-1). $ZnCl_2$ (0.1 mol) was dissolved in a mixture of distilled water (100 ml) and tertiary-butanol (20 ml) (Solution-2). Poly(ethylene glycol)-block-poly(propylene glycol)-block-poly(ethylene glycol) ($EO_{20}$-$PO_{70}$-$EO_{20}$; molecular weight of about 5800) (15 g) was separately dissolved in 2 ml of distilled water and 40 ml of tertiary-butanol (Solution-3). Solution-2 was added to solution-1 over 60 min at 50° C. with vigorous stirring. White precipitation occurred during the addition. Then, solution-3 was added to the above reaction mixture over a period of 5 min and stirring was continued for further 1 h. The solid cake formed was filtered, washed with distilled water (500 ml) and dried at 25° C. for 2 days. This material was activated at 180° C. for 4 h prior to using it in the reactions. Refer U.S. Pat. No. 7,754,643 and FIG. 1.

EXAMPLE 2

This example illustrates the preparation of Co—Zn double metal cyanide catalyst used in the present invention. $K_4[Co(CN)_6]$ (0.01 mol) was dissolved in double distilled water (40 ml) (Solution-1). $ZnCl_2$ (0.1 mol) was dissolved in a mixture of distilled water (100 ml) and tertiary-butanol (20 ml) (Solution-2). Poly(ethylene glycol)-block-poly(propylene glycol)-block-poly(ethylene glycol) ($EO_{20}$-$PO_{70}$-$EO_{20}$; molecular weight of about 5800) (15 g) was separately dissolved in 2 ml of distilled water and 40 ml of tertiary-butanol (Solution-3). Solution-2 was added to solution-1 over 60 min at 50° C. with vigorous stirring. White precipitation occurred during the addition. Then, solution-3 was added to the above reaction mixture over a period of 5 min and stirring was continued for further 1 h. The solid formed was filtered, washed with distilled water (500 ml) and dried at 25° C. This material was activated at 180° C. for 4 h prior to using it in the reactions. Refer U.S. Pat. No. 7,754,643

EXAMPLE 3

This example describes the preparation of hyperbranched polyester derived from bio-glycerol and succinic acid over Fe—Zn double-metal cyanide catalyst at 180° C. Glycerol (1 mol), succinic acid (1 mol), catalyst (3 wt % of reaction mixture) were taken in a glass round-bottom flask. The temperature was raised to 180° C. The reaction was carried out for 1 h at atmospheric pressure. After cooling to 25° C., about 10 ml of dry-acetone was to the contents of the flask. Catalyst was separated by centrifugation followed by filtration. The polymer was reprecipitated by adding 20 ml of n-heptane. The product polyester is a clear liquid. $^{13}C$ NMR spectroscopy was used to analyze the degree of branching and viscosity (in dry-tetrahydrofuran solvent) was determined using a Ubbelhode viscometer.

EXAMPLE 4

This example describes the preparation of hyperbranched polyester by reacting bio-glycerol with succinic acid at 180°

C. for 1.5 h over Fe—Zn double-metal cyanide catalyst. Glycerol (1 mol), succinic acid (1 mol), catalyst (3 wt % of reaction mixture) were taken in a glass round-bottom flask. The temperature was raised to 180° C. The reaction was carried out for 1.5 h at atmospheric pressure. After cooling to 25° C., about 10 ml of dry-acetone was to the contents of the flask. Catalyst was separated by centrifugation followed by filtration. The polymer was reprecipitated by adding 20 ml of n-heptane. The product polyester is a clear liquid. $^{13}$C NMR spectroscopy was used to analyze the degree of branching and viscosity (in dry-tetrahydrofuran solvent) was determined using a Ubbelhode viscometer.

EXAMPLE 5

This example describes the preparation of hyperbranched polyester by reacting bio-glycerol with succinic acid at 180° C. for 2 h over Fe—Zn double-metal cyanide catalyst. Glycerol (1 mol), succinic acid (1 mol), catalyst (3 wt % of reaction mixture) were taken in a glass round-bottom flask. The temperature was raised to 180° C. The reaction was carried out for 2 h at atmospheric pressure. After cooling to 25° C., about 10 ml of dry-acetone was to the contents of the flask. Catalyst was separated by centrifugation followed by filtration. The polymer was reprecipitated by adding 20 ml of n-heptane. The product polyester is a clear liquid. $^{13}$C NMR spectroscopy was used to analyze the degree of branching and viscosity (in dry-tetrahydrofuran solvent) was determined using a Ubbelhode viscometer.

EXAMPLE 6

This example describes the preparation of hyperbranched polyester by reacting glycerol with succinic acid at 190° C. for 1.5 h over Fe—Zn double-metal cyanide catalyst. Glycerol (1 mol), succinic acid (1 mol), catalyst (3 wt % of reaction mixture) were taken in a glass round-bottom flask. The temperature was raised to 190° C. The reaction was carried out for 1.5 h at atmospheric pressure. After cooling to 25° C., about 10 ml of dry-acetone was to the contents of the flask. Catalyst was separated by centrifugation followed by filtration. The polymer was reprecipitated by adding 20 ml of n-heptane. The product polyester is a clear liquid. $^{13}$C NMR spectroscopy was used to analyze the degree of branching and viscosity (in dry-tetrahydrofuran solvent) was determined using a Ubbelhode viscometer.

EXAMPLE 7

This example describes the preparation of hyperbranched polyester by reacting glycerol with succinic acid in the molar ratio of 1:1.5 at 180° C. for 1.5 h over Fe—Zn double-metal cyanide catalyst. Glycerol (1 mol), succinic acid (1.5 mol), catalyst (3 wt % of reaction mixture) were taken in a glass round-bottom flask. The temperature was raised to 180° C. The reaction was carried out for 1.5 h at atmospheric pressure. After cooling to 25° C., about 10 ml of dry-cetone was to the contents of the flask. Catalyst was separated by centrifugation followed by filtration. The polymer was reprecipitated by adding 20 ml of n-heptane. The product polyester is a clear liquid. $^{13}$C NMR spectroscopy was used to analyze the degree of branching and viscosity (in dry-tetrahydrofuran solvent) was determined using a Ubbelhode viscometer.

EXAMPLE 8

This example describes the preparation of hyperbranched polyester by reacting glycerol with succinic acid in the molar ratio of 1:2 at 180° C. for 1.5 h over Fe—Zn double-metal cyanide catalyst. Glycerol (1 mol), succinic acid (2 mol), catalyst (3 wt % of reaction mixture) were taken in a glass round-bottom flask. The temperature was raised to 180° C. The reaction was carried out for 1.5 h at atmospheric pressure. After cooling to 25° C., about 10 ml of dry-acetone was to the contents of the flask. Catalyst was separated by centrifugation followed by filtration. The polymer was reprecipitated by adding 20 ml of n-heptane. The product polyester is a clear liquid. $^{13}$C NMR spectroscopy was used to analyze the degree of branching and viscosity (in dry-tetrahydrofuran solvent) was determined using a Ubbelhode viscometer.

EXAMPLE 9

This example describes the preparation of hyperbranched polyester by reacting bio-glycerol with adipic acid at 180° C. for 2 h over Fe—Zn double-metal cyanide catalyst. Glycerol (1 mol), adipic acid (1 mol), catalyst (3 wt % of reaction mixture) were taken in a glass round-bottom flask. The temperature was raised to 180° C. The reaction was carried out for 2 h at atmospheric pressure. After cooling to 25° C., about 10 ml of dry-acetone was to the contents of the flask. Catalyst was separated by centrifugation followed by filtration. The polymer was reprecipitated by adding 20 ml of n-heptane. The product polyester is a clear liquid. $^{13}$C NMR spectroscopy was used to analyze the degree of branching and viscosity (in dry-tetrahydrofuran solvent) was determined using a Ubbelhode viscometer.

EXAMPLE 11

This example describes the preparation of hyperbranched polyester by reacting glycerol with adipic acid at 190° C. for 1.5 h over Fe—Zn double-metal cyanide catalyst. Glycerol (1 mol), adipic acid (1 mol), catalyst (3 wt % of reaction mixture) were taken in a glass round-bottom flask. The temperature was raised to 190° C. The reaction was carried out for 1.5 h at atmospheric pressure. After cooling to 25° C., about 10 ml of dry-acetone was to the contents of the flask. Catalyst was separated by centrifugation followed by filtration. The polymer was reprecipitated by adding 20 ml of n-heptane. The product polyester is a clear liquid. $^{13}$C NMR spectroscopy was used to analyze the degree of branching and viscosity (in dry-tetrahydrofuran solvent) was determined using a Ubbelhode viscometer.

EXAMPLE 12

This example describes the preparation of hyperbranched polyester by reacting glycerol with adipic acid at a molar ratio of 1:2 at 180° C. for 1.5 h over Fe—Zn double-metal cyanide catalyst. Glycerol (1 mol), adipic acid (2 mol), catalyst (3 wt % of reaction mixture) were taken in a glass round-bottom flask. The temperature was raised to 180° C. The reaction was carried out for 1.5 h at atmospheric pressure. After cooling to 25° C., about 10 ml of dry-acetone was to the contents of the flask. Catalyst was separated by centrifugation followed by filtration. The polymer was reprecipitated by adding 20 ml of n-heptane. The product polyester is a clear liquid. $^{13}$C NMR spectroscopy was used to analyze the degree of branching and viscosity (in dry-tetrahydrofuran solvent) was determined using a Ubbelhode viscometer.

EXAMPLE 13

This example describes the preparation of hyperbranched polyester derived from sorbitol and succinic acid over Fe—Zn double-metal cyanide catalyst at 180° C. Sorbitol (1 mol), succinic acid (1 mol), catalyst (3 wt % of reaction mixture) were taken in a glass round-bottom flask. The temperature was raised to 180° C. The reaction was carried out for 1 h at atmospheric pressure. After cooling to 25° C., about 10 ml of dry-acetone was to the contents of the flask. Catalyst was separated by centrifugation followed by filtration. The polymer was reprecipitated by adding 20 ml of n-heptane. The product polyester is a clear liquid. $^{13}$C NMR spectroscopy was used to analyze the degree of branching and viscosity (in dry-tetrahydrofuran solvent) was determined using a Ubbelhode viscometer.

EXAMPLE 14

This example illustrated the reusability of the catalyst recovered from example 3. In a typical reaction, glycerol (1 mol), succinic acid (1 mol), recovered Fe—Zn double-metal cyanide catalyst (3 wt % of reaction mixture) were taken in a glass round-bottom flask. The temperature was raised to 180° C. The reaction was carried out for 1 h at atmospheric pressure. After cooling to 25° C., about 10 ml of dry-acetone was to the contents of the flask. Catalyst was separated by centrifugation followed by filtration. The polymer was reprecipitated by adding 20 ml of n-heptane. The product polyester is a clear liquid. $^{13}$C NMR spectroscopy was used to analyze the degree of branching and viscosity (in dry-tetrahydrofuran solvent) was determined using a Ubbelhode viscometer.

EXAMPLE 15

This example describes the preparation of hyperbranched polyester derived from glycerol and succinic acid over Co—Zn double-metal cyanide catalyst at 180° C. Glycerol (1 mol), succinic acid (1 mol), catalyst (3 wt % of reaction mixture) were taken in a glass round-bottom flask. The temperature was raised to 180° C. The reaction was carried out for 1 h at atmospheric pressure. After cooling to 25° C., about 10 ml of dry-acetone was added to the contents of the flask. Catalyst was separated by centrifugation followed by filtration. The polymer was reprecipitated by adding 20 ml of n-heptane. The product polyester is a clear liquid. $^{13}$C NMR spectroscopy was used to analyze the degree of branching and viscosity (in dry-tetrahydrofuran solvent) was determined using a Ubbelhode viscometer.

The characteristics of different hyperbranched polyesters obtained from Examples 3-15 are listed in Table 1.

TABLE 1

Characteristics of different hyperbranched polyesters[a]

| Example No | Polyol:polyacid molar ratio | Reaction temperature (° C.) | Reaction time (h) | DB (%) | η (dL/g) | Isolated polyester yield (wt %) |
|---|---|---|---|---|---|---|
| 3 | G:SA (1:1) | 180 | 1.0 | 48 | 0.024 | 57 |
| 4 | G:SA (1:1) | 180 | 1.5 | 60 | 0.045 | 52 |
| 5 | G:SA (1:1) | 180 | 2.0 | 64 | 0.050 | 49 |
| 6 | G:SA (1:1) | 190 | 1.5 | 56 | 0.043 | 53 |
| 7 | G:SA (1:1.5) | 180 | 1.5 | 81 | 0.024 | 52 |
| 8 | G:SA (1:2) | 180 | 1.5 | 90 | 0.026 | 62 |
| 9 | G:AA (1:1) | 180 | 2.0 | 56 | 0.067 | 71 |
| 10 | G:AA (1:1) | 190 | 1.5 | 58 | 0.070 | 76 |
| 11 | G:AA (1:2) | 180 | 1.5 | 84 | 0.07 | 47 |
| 12 | S:SA (1:1) | 180 | 1.0 | — | 0.062 | 58 |
| 13 | G:SA (1:1) | 180 | 1.0 | 48 | 0.024 | 55 |
| 14 | G:SA (1:1) | 180 | 1.0 | 48 | 0.024 | 55 |
| 15 | G:SA (1:1) | 180 | 1.0 | 41 | 0.023 | 83 |

[a]G = glycerol, S = sorbitol, SA = succinic acid, AA = adipic acid, DB = degree of branching, η = inherent viscosity.

Many modifications, substitutions and variations of the present invention are possible and apparent to those skilled in the art. The present invention can be practiced other than specifically described in the examples and should be limited in scope and breadth only by the appended claims.

Advantages of the Invention

Advantages of instant invention are as following:
1. Heterogeneous, solid acid catalyst-based process
2. Reusable catalyst process
3. Solvent-free process
4. Low viscosity product with high degree of branching
5. Reaction at moderate temperatures and for short periods of time.
6. Applicable to a large number of polyols and polycarboxylic acids
7. Flexible process with tunability of final ester product properties.

We claim:

1. A process for preparing a hyper-branched polyester having degree of branching in a range of 56-90% and an inherent viscosity in a range of 0.02-0.1 dL/g, the process comprising the steps of:
   (a) contacting a polyol with a polycarboxylic acid in the presence of a double-metal cyanide catalyst,
   wherein the double-metal cyanide catalyst is $Zn_3M_2(CN)_n(ROH).xZnCl_2.yH_2O$; R is tertiary-butyl; M is Fe or Co; x varies from 0 to 0.5, y varies from 3-5 and n is 10 or 12;
   the polyol to the polycarboxylic acid is in 1:1 to 1:2 molar ratio; and
   the double-metal cyanide catalyst is 2-5 wt % of a sum of the polyol and the polycarboxylic acid by weight;
   (b) subjecting the reaction mixture as obtained in step (a) at temperature in the range of 160 to 200° C. at atmospheric pressure and for a reaction period of 0.5-2 h;
   (c) dissolving the reaction mixture obtained in step (b) in a polar solvent and separating the double-metal cyanide catalyst by filtration; and
   (d) adding a non-polar solvent to the reaction mixture obtained from step (c) to precipitate out and isolate the hyper-branched polyester.

2. The process as claimed in claim 1, wherein the catalyst possesses micro-mesoporous architecture and an average pore diameter of 2.5 nanometers.

3. The process as claimed in claim 1, wherein the catalyst is hydrophobic at reaction conditions and contains Lewis acid centers due to tetra-coordinated $Zn^{2+}$ ions in the crystalline framework with the total acidity being in the range 1.5-2.2 mmol/g.

4. The process as claimed in claim 1, wherein the polyol used in step (a) has more than two hydroxyl groups.

5. The process as claimed in claim 1, wherein the polyols is selected from the group consisting of glycerol, sorbitol, mannitol, glucose and sucrose.

6. The process as claimed in claim 1, wherein the polycarboxylic acid used in step (a) contains more than two carboxyl groups.

7. The process as claimed in claim 1, wherein the polycarboxylic acid used in step (a) is selected from the group consisting of succinic acid and adipic acid.

8. The process as claimed in claim 1, wherein the double-metal cyanide catalyst is reusable.

9. The process as claimed in claim 1, wherein an isolated yield of the hyper-branched polyester is 50-90 wt %.

10. The process as claimed in claim 1, wherein the polar solvent is acetone.

11. The process as claimed in claim 1, wherein the non-polar solvent is heptane.

* * * * *